(12) United States Patent
Nakano et al.

(10) Patent No.: US 10,724,573 B2
(45) Date of Patent: Jul. 28, 2020

(54) JOURNAL DEVICE AND ROTARY MACHINE (71) Applicant: Mitsubishi Hitachi Power Systems, Ltd., Yokohama-shi, Kanagawa (JP)

(72) Inventors: Takashi Nakano, Yokohama (JP); Tanehiro Shinohara, Tokyo (JP); Takaaki Kaikogi, Tokyo (JP); Yuichiro Waki, Yokohama (JP); Yutaka Ozawa, Takasago (JP)

(73) Assignee: MITSUBISHI HITACHI POWER SYSTEMS, LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 16/086,820

(22) PCT Filed: Aug. 10, 2016

(86) PCT No.: PCT/JP2016/073667
§ 371 (c)(1),
(2) Date: Sep. 20, 2018

(87) PCT Pub. No.: WO2018/029836
PCT Pub. Date: Feb. 15, 2018

(65) Prior Publication Data
US 2019/0128321 A1 May 2, 2019

(51) Int. Cl.
*F16C 17/03* (2006.01)
*F16C 33/10* (2006.01)

(52) U.S. Cl.
CPC .......... *F16C 17/03* (2013.01); *F16C 33/1045* (2013.01)

(58) Field of Classification Search
CPC .......... F16C 17/02; F16C 17/03; F16C 33/10; F16C 33/1025; F16C 33/1055
See application file for complete search history.

(56) References Cited

U.S. PATENT DOCUMENTS 4,764,034 A 8/1988 Fust et al.
8,123,409 B2 2/2012 Waki et al.
(Continued)

FOREIGN PATENT DOCUMENTS

CN  87107378 A  6/1988
CN  101981333 A  2/2011
(Continued)

OTHER PUBLICATIONS

Notification of Transmittal of Translation of the International Preliminary Report on Patentability (Form PCT/IB/326) issued in counterpart International Application No. PCT/JP2016/073667 dated Feb. 21, 2019 with Forms PCT/IB/373, PCT/IB/338 and PCT/ISA/237, with English translation. (12 pages).
(Continued)

*Primary Examiner* — James Pilkington
(74) *Attorney, Agent, or Firm* — Westerman, Hattori, Daniels & Adrian, LLP (57) ABSTRACT

A journal bearing includes: a carrier ring having a cylindrical shape; at least two bearing pads disposed on a radially inner side of the carrier ring and configured to support a rotor shaft; at least one oil-supply unit disposed on the radially inner side of the carrier ring, for supplying lubricant oil to a gap between the bearing pad and the rotor shaft; a pair of side plates disposed on both end portions of the carrier ring with respect to an axial direction, along an outer periphery of the rotor shaft; and at least one opening configured to bring a bearing interior space surrounded by the at least two bearing pads and the pair of side plates into communication with atmosphere, and discharge the lubricant oil to outside via the bearing interior space.

9 Claims, 7 Drawing Sheets (56) References Cited

U.S. PATENT DOCUMENTS

| | | | |
|---|---|---|---|
| 8,371,756 | B2 | 2/2013 | Waki et al. |
| 9,217,464 | B2* | 12/2015 | Rudolph ................. F16C 17/03 |
| 2010/0142870 | A1 | 6/2010 | Waki et al. |
| 2010/0220944 | A1* | 9/2010 | Waki ....................... F16C 17/03 384/418 |
| 2017/0260874 | A1* | 9/2017 | Yoshimine .............. F01D 25/18 |

FOREIGN PATENT DOCUMENTS

| | | |
|---|---|---|
| CN | 102149931 A | 8/2011 |
| JP | S58-0180814 A | 10/1983 |
| JP | 2000-213542 A | 8/2000 |
| JP | 2003-176818 A | 6/2003 |
| JP | 2006-112612 A | 4/2006 |
| JP | 2010-116956 A | 5/2010 |
| JP | 2010-203481 A | 9/2010 |
| JP | 2010-242842 A | 10/2010 |
| JP | 4764486 B2 | 9/2011 |
| JP | 2014-202268 A | 10/2014 |

OTHER PUBLICATIONS

International Search Report dated Nov. 8, 2016, issued in counterpart application No. PCT/JP2016/073667, with partial English translation. (11 pages).

Office Action dated Sep. 25, 2019, issued in counterpart KR Application No. 10-2018-7027234, with English translation. (11 pages).

Office Action dated Aug. 5, 2019, issued in counterpart CN Application No. 201680084055.2, with English translation. (12 pages).

Office Action dated Mar. 16, 2020, issued in counterpart CN application No. 201680084055.2. (4 pages).

* cited by examiner

JOURNAL DEVICE AND ROTARY MACHINE

TECHNICAL FIELD

The present disclosure relates to a journal bearing and a rotary machine.

BACKGROUND ART

Generally, a journal bearing is widely known as a bearing device used in rotary machines such as steam turbines, gas turbines, blowers, and compressors.

For instance, Patent Document 1 discloses a journal bearing that includes a carrier ring, two bearing pads, and a plurality of oil-supply nozzles. An oil-supply nozzle supplies lubricant oil supplied thereto to a gap between the outer peripheral surface of a rotor shaft and the inner peripheral surface of a bearing pad.

CITATION LIST

Patent Literature

Patent Document 1: JP4764486B
Patent Document 2: JPS58-180814A
Patent Document 3: JP2014-202268A
Patent Document 4: JP2003-176818A
Patent Document 5: JP2010-242842A

SUMMARY

Problems to be Solved

The present inventors found that, in the journal bearing disclosed in Patent Document 1, it may be difficult to form an oil film having a sufficient thickness on the bearing pads. It was found that it is difficult to ensure a sufficient oil-film thickness on the bearing pads particularly in a case where the surface pressure of the rotor shaft on the bearing pads is low, or in a case where the rotor shaft rotates in a low rotation speed region.

In view of the above, an object of at least one embodiment of the present invention is to provide a journal bearing and a rotary machine whereby it is possible to ensure a sufficient oil film thickness on bearing pads, and to suppress an increase in stirring resistance of the rotor shaft.

Solution to the Problems (1) A journal bearing according to at least one embodiment of the present invention includes: a carrier ring having a cylindrical shape; at least two bearing pads disposed on a radially inner side of the carrier ring and configured to support a rotor shaft; at least one oil-supply unit disposed on the radially inner side of the carrier ring, for supplying lubricant oil to a gap between the bearing pad and the rotor shaft; a pair of side plates disposed on both end portions of the carrier ring with respect to an axial direction, along an outer periphery of the rotor shaft; and at least one opening configured to bring a bearing interior space surrounded by the at least two bearing pads and the pair of side plates into communication with atmosphere, and discharge the lubricant oil to outside via the bearing interior space.

As a result of intensive researches by the present inventors, it was found that the oil film thickness at the first bearing pad in the typical journal bearing disclosed in Patent Document 1 becomes insufficient due to shortage of lubricant oil that is carried over to the bearing pad. That is, in the journal bearing, lubricant oil is less likely to be carried over due to the head difference. In addition, a gap is provided between the inner peripheral surfaces of the respective side plates and the outer peripheral surface of the rotor shaft for bringing into communication the outside and a bearing interior space surrounded by the pair of side plates, and thus lubricant oil is likely to leak. Thus, lubricant oil to be carried over to the first bearing pad reduces, which leads to shortage of lubricant oil to be carried over to the first bearing pad. Thus, even if the first oil-supply unit immediately before and upstream of the first bearing pad and the second oil-supply unit immediately before and upstream of the second bearing pad discharge the same amount of oil, the lubricant oil is likely to become insufficient at the first bearing pad compared to the second bearing pad. Particularly in a case where the surface pressure of the rotor shaft on the first bearing pad and the second bearing pad is low, or in a case where the rotor shaft rotates in a low rotation speed region, a smaller amount of lubricant oil is carried over to the first bearing pad, and the shortage of lubricant oil at the first bearing pad is remarkable. When lubricant oil supplied to the first bearing pad is insufficient, the first bearing pad is not wet from the inlet and the generation region of the oil film pressure becomes narrow, which causes the oil film of the first bearing pad to become thinner. Accordingly, in a case where the surface pressure of the rotor shaft on the first bearing pad and the second bearing pad is low, or in a case where the rotor shaft rotates in a low rotation speed region, the shaft center trajectory of the rotor shaft may deviate from the vertical line and impair the isotropic nature of the journal bearing.

On the other hand, in a case where the gap between the outer peripheral surface of the rotor shaft and the inner peripheral surface of the side plate is narrow, although it is possible to reduce the amount of lubricant oil that leaks from the gap between the outer peripheral surface of the rotor shaft and the inner peripheral surface of the side plate, the lubricant oil fills the bearing interior space, which may cause an increase in the stirring resistance of the rotor shaft.

With the above configuration (1), even if the gap between the inner peripheral surface of the side plate and the outer peripheral surface of the rotor shaft is narrowed, lubricant oil is discharged outside through the opening from the bearing interior space, which prevents the bearing interior space from being filled with the lubricant oil, which makes it possible to suppress an increase in the stirring resistance of the rotor shaft.

(2) In some embodiments, in the above configuration (1), the at least one oil-supply unit includes an oil supply unit disposed on a circumferential-directional position interposed between the at least two bearing pads.

With the above configuration (2), lubricant oil is supplied to the gap between the rotor shaft and the downstream bearing pad from the oil-supply unit, and lubricant oil used in the upstream bearing pad is replaced with the lubricant oil supplied from the oil-supply unit. Accordingly, the downstream bearing pad can lubricate the rotor shaft with the lubricant oil supplied freshly from the oil-supply unit.

(3) In some embodiments, in the above configuration (1) or (2), the at least one opening is disposed in a lower half region of the side plates.

With the above configuration (3), excess lubricant oil is discharged from the lower half region of the side plates. In this way, it is possible to suppress an increase in stirring loss of the rotor shaft.

(4) In some embodiments, in any one of the above configurations (1) to (3), the at least one opening is disposed in a lower half region of the carrier ring.

With the above configuration (4), excess lubricant oil is discharged from the lower half region of the carrier ring. In this way, it is possible to suppress an increase in stirring loss of the rotor shaft.

(5) In some embodiments, in any one of the above configurations (1) to (4), the at least two bearing pads include: a first bearing pad disposed on a radially inner side of a lower half region of the carrier ring; and a second bearing pad disposed on the radially inner side of the lower half region of the carrier ring, on a downstream side of the first bearing pad with respect to a rotational direction of the rotor shaft, and configured to support the rotor shaft from below. The at least one opening is disposed on a circumferential-directional position between the first bearing pad and the second bearing pad.

With the above configuration (5), excess lubricant oil is discharged from the circumferential directional positions between the first bearing pad and the first bearing pad. In this way, it is possible to avoid congestion of lubricant oil between the first bearing pad and the second bearing pad, and suppress an increase in stirring loss of the rotor shaft.

(6) In some embodiments, in the above configuration (5), the at least one oil-supply unit includes: a first oil-supply unit positioned immediately before and upstream of the first bearing pad; and a second oil-supply unit disposed on the circumferential-directional position between the first bearing pad and the second bearing pad.

With the above configuration (6), lubricant oil is supplied from the first oil-supply unit to the first bearing pad, and lubricant oil is supplied from the second oil-supply unit to the second bearing pad. Accordingly, lubricant oil used for the first bearing pad is replaced with lubricant oil supplied from the second oil-supply unit, and the second bearing pad can lubricate the rotor shaft with the lubricant oil supplied freshly from the second oil-supply unit.

(7) In some embodiments, in the above configuration (5) or (6), the journal bearing further includes a guide metal disposed on a radially inner side of an upper half region of the carrier ring, the guide metal covering an upper region of an outer peripheral surface of the rotor shaft. The at least one opening is disposed on at least one of a circumferential-directional position between the guide metal and the first bearing pad or a circumferential-directional position between the guide metal and the second bearing pad, in addition to the circumferential-directional position between the first bearing pad and the second bearing pad.

With the above configuration (7), excess lubricant oil is discharged from the circumferential directional position between the guide metal and the first bearing pad, or from the circumferential directional position between the guide metal and the second bearing pad. In this way, it is possible to avoid congestion of lubricant oil between the guide metal and the first bearing pad or between the guide metal and the second bearing pad, and suppress an increase in stirring loss of the rotor shaft.

(8) In some embodiments, in any one of the above configurations (5) to (7), the journal bearing further includes a third oil-supply unit disposed downstream of the second bearing pad.

With the above configuration (8), lubricant oil is supplied to the rotor shaft from the third oil-supply unit, and lubricant oil that is carried over (supplied) to the first bearing pad increases.

(9) In some embodiments, in any one of the above configurations (1) to (8), the journal bearing further includes a guide metal disposed on a radially inner side of an upper half region of the carrier ring, the guide metal covering an upper region of an outer peripheral surface of the rotor shaft. The at least one opening is disposed in a circumferential positional range excluding an extending range of the guide metal.

With the above configuration (9), lubricant oil is less likely to leak from the extending range of the guide metal, which makes it possible to promote carry over of lubricant oil effectively despite a head difference.

(10) A rotary machine according to at least one embodiment of the present invention includes: the journal bearing according to any one of the above (1) to (9); and a rotor shaft supported by the journal bearing.

With the above configuration (10), it is possible to avoid congestion of lubricant oil in the bearing interior space, and suppress an increase in stirring loss of the rotor shaft.

Advantageous Effects

According to at least one embodiment of the present invention, it is possible to avoid congestion of lubricant oil in the bearing interior space, and suppress an increase in stirring loss of the rotor shaft.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
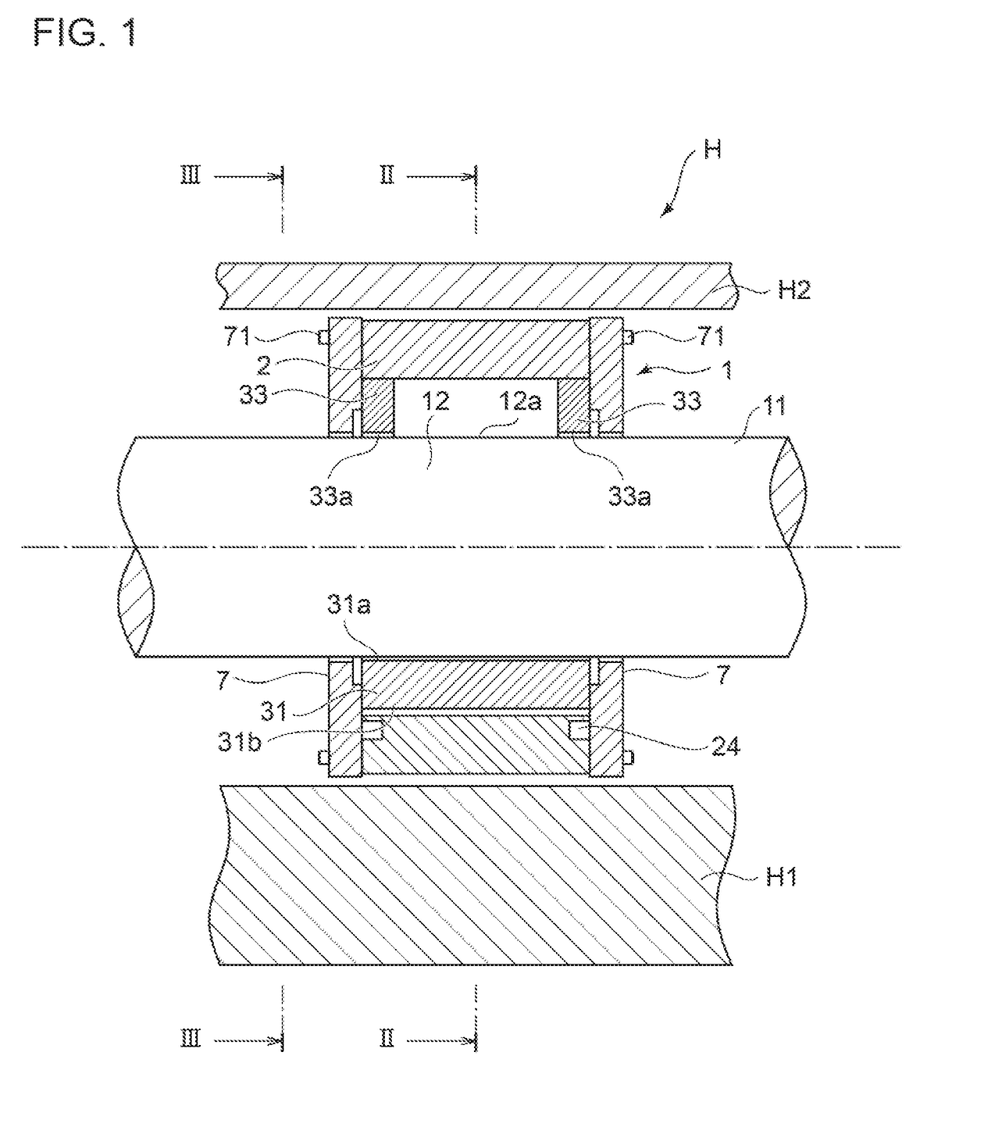
FIG. 1 is a schematic cross-sectional view of a journal bearing according to an embodiment of the present invention, the journal bearing being supported on a housing.
Figure 2:
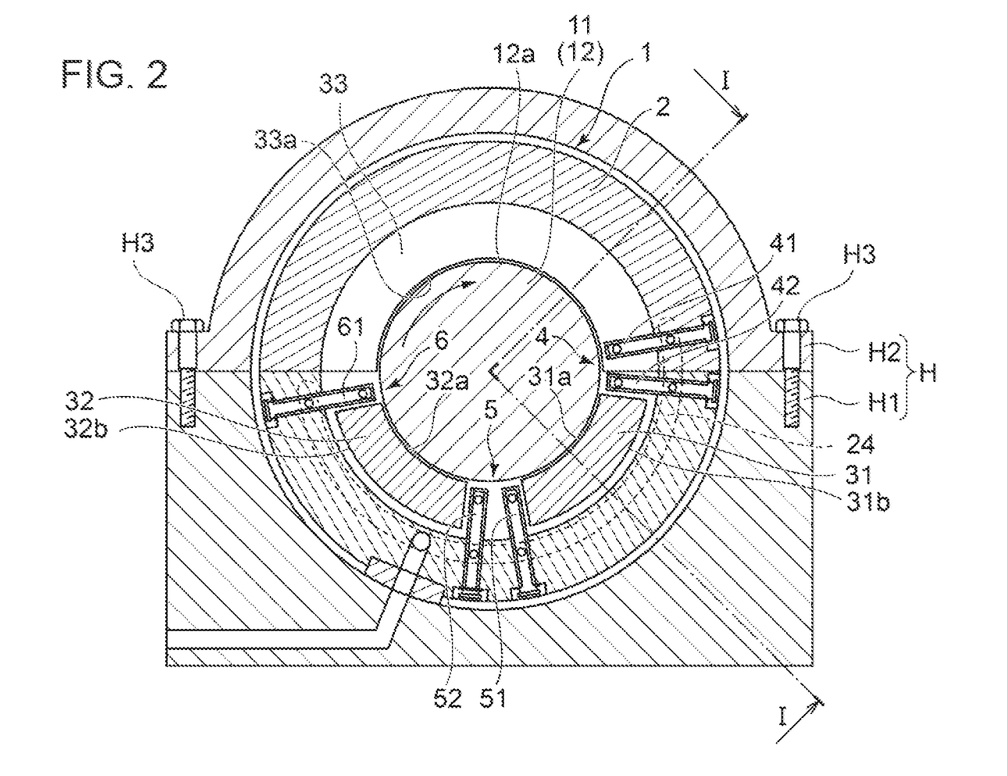
FIG. 2 is a cross-sectional view of the journal bearing shown in FIG. 1 supported on the housing, taken along line II-II.
Figure 3:
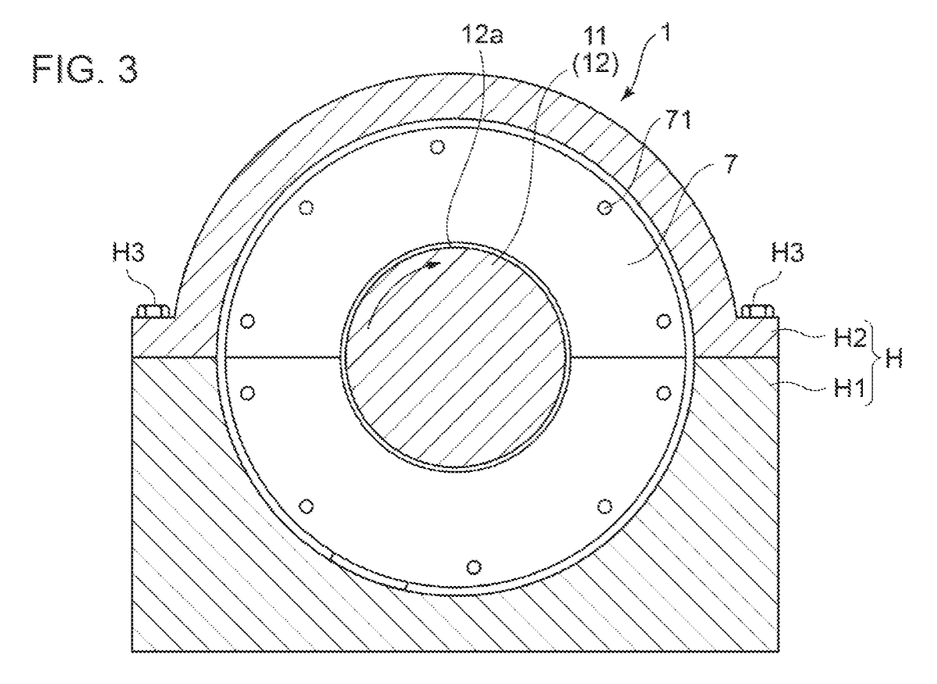
FIG. 3 is a cross-sectional view of the journal bearing 1 shown in FIG. 1 supported on the housing, taken along line III-III.
Figure 5:
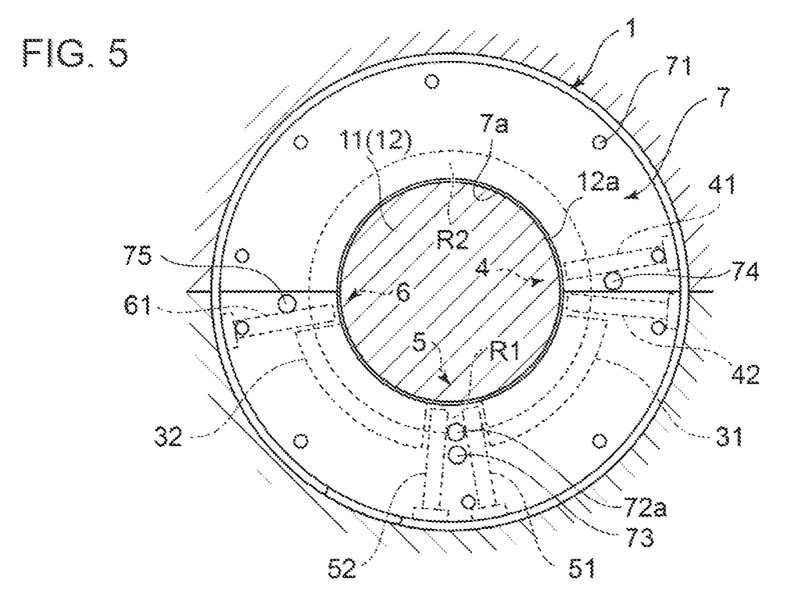
FIG. 5 is a schematic view of a journal bearing according to an embodiment.
Figure 6:
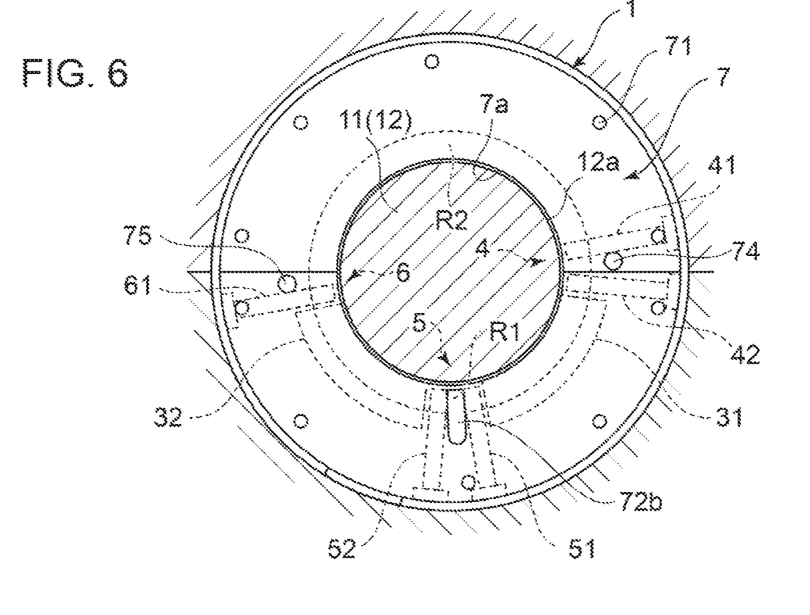
FIG. 6 is a schematic view of a journal bearing according to an embodiment.
Figure 7:
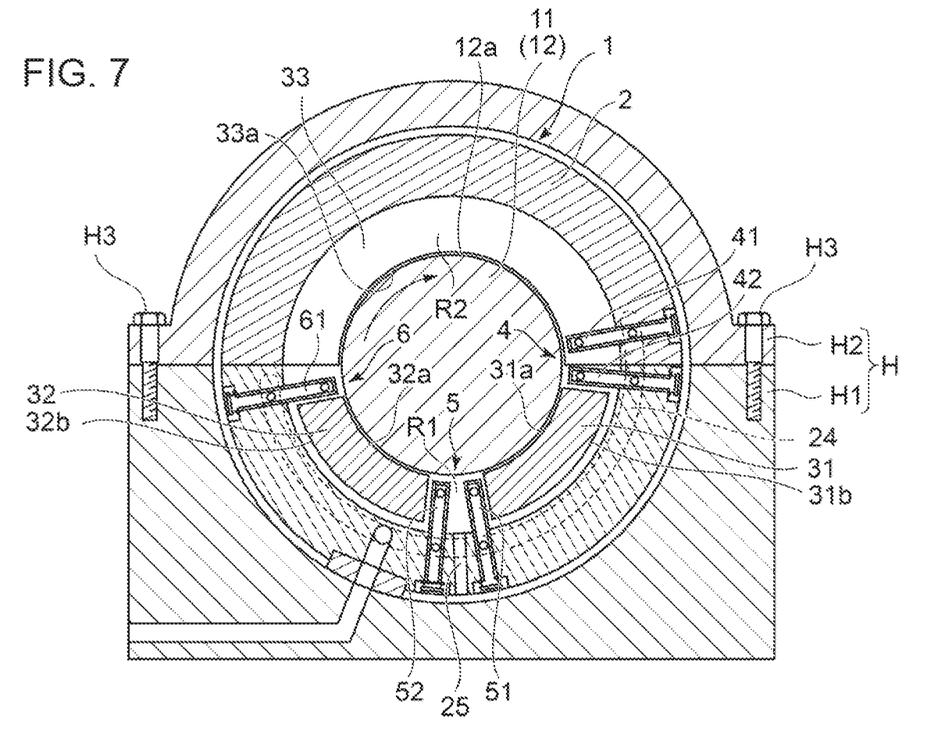
FIG. 7 is a schematic view of a journal bearing according to an embodiment.

FIG. 1 is a schematic cross-sectional view of a journal bearing 1 according to an embodiment of the present invention, the journal bearing being supported on a housing H. FIG. 2 is a cross-sectional view of the journal bearing 1 shown in FIG. 1 supported on the housing H, taken along line II-II. FIG. 3 is a cross-sectional view of the journal bearing 1 shown in FIG. 1 supported on the housing H, taken along line III-III. Further, FIGS. 5 to 7 are each a schematic view of the journal bearing 1 according to some embodiments.

FIG. 1 is also a cross-sectional view of the journal bearing 1 shown in FIG. 1 supported on the housing shown in FIG. 2, taken along line III-III.

In some embodiments, as shown in FIGS. 1 to 3, the journal bearing 1 is a mechanical element for rotatably supporting the rotor shaft 11, supported by the housing H, to be mounted to a rotary machine such as a steam turbine, a gas turbine, a blower, and a compressor. As shown in FIGS. 2 and 3, the housing H includes a mount portion H1 constituting a lower half section in the gravity direction with reference to the axis of the rotor shaft 11, and a cover H2 constituting an upper half section in the gravity direction. While the journal bearing 1 according to an embodiment of the present invention is interposed between the mount portion H1 and the cover H2, the cover H2 is fastened to the mount portion H1 with a bolt H3. Accordingly, the journal bearing 1 is supported by the housing H, and the rotor shaft 11 supported rotatably by the journal bearing 1 is also supported rotatably with respect to the housing H.

In some embodiments, as shown in FIGS. 1 to 3, the journal bearing 1 includes a carrier ring 2, at least two bearing pads (31, 32), at least one oil-supply unit (4, 5, 6), and a pair of side plates 7, 7.

As shown in FIGS. 1 and 2, the carrier ring 2 is disposed inside the housing H, and is capable of surrounding a part of the rotor shaft 11, that is, a journal 12, in a cylindrical space. The carrier ring 2 has a cylindrical shape with a rectangular cross section, for instance.

As shown in FIG. 2, in some embodiments, the journal bearing includes at least two bearing pads (31, 32) for supporting the rotor shaft 11 from below.

These two bearing pads (31, 32) are disposed on the radially inner side of the lower half region of the carrier ring 2, and are configured to be capable of supporting the rotor shaft 11 from below.

The first bearing pad 31 is disposed on the radially inner side of the lower half region of the carrier ring 2, and is configured to support the rotor shaft 11 from below. The first bearing pad 31 has a fan shape when seen along the axial direction of the carrier ring 2, and has an inner peripheral surface 31a and an outer peripheral surface 31b which are curved. The inner peripheral surface 31a of the first bearing pad 31 is formed by a bearing alloy, such as white metal, and is disposed so as to face a part of the rotor shaft 11, that is, the outer peripheral surface 12a of the journal 12.

Further, in some embodiments, a tilting unit (not shown) is disposed between the first bearing pad 31 and the carrier ring 2, and the first bearing pad 31 is supported to be capable of tilting.

The second bearing pad 32 is disposed on the radially inner side of the lower half region of the carrier ring 2 on the downstream side of the first bearing pad 31 with respect to the rotational direction of the rotor shaft 11, and is configured to support the rotor shaft 11 from below. Similarly to the first bearing pad 31, the second bearing pad 32 has a fan shape when seen along the axial direction of the carrier ring 2, and has an inner peripheral surface 32a and an outer peripheral surface 32b which are curved. Similarly to the first bearing pad 31, the inner peripheral surface 32a of the second bearing pad 32 is formed by a bearing alloy, such as white metal, and is disposed so as to face the outer peripheral surface 12a of the journal 12.

Further, in some embodiments, similarly to between the second bearing pad 32 and the carrier ring 2, a tilting unit (not shown) is disposed between the second bearing pad 32 and the carrier ring 2, and the second bearing pad 32 is supported to be capable of tilting.

Further, in some embodiments, a guide metal 33 is further provided.

The guide metal 33 is disposed on the radially inner side of the upper half region of the carrier ring 2, and is fixed to the carrier ring 2 with a bolt or the like (not shown). The guide metal 33 has a fan shape when seen along the axial direction of the carrier ring 2, and covers an upper region of the outer peripheral surface of the rotor shaft 11. The guide metal 33 has a bearing surface 33a on the inner side with respect to the radial direction of the carrier ring 2. The bearing surface 22a is curved along the upper region of the outer peripheral surface 12a of the journal 12, and faces the upper region of the outer peripheral surface 12a of the journal 12 via a bearing gap.

As shown in FIG. 2, in some embodiments, the journal bearing 1 includes at least one oil-supply unit (4, 5, 6) for supplying lubricant oil to the rotor shaft 11.

The at least one oil-supply units (4, 5, 6) are disposed separated from one another in the circumferential direction, and are each capable of supplying lubricant oil to the rotor shaft 11. For instance, a manifold 24 is formed through the carrier ring 2, and lubricant oil is supplied to the plurality of oil-supply units (4, 5, 6) through the manifold 24.

The first oil-supply unit 4 is for supplying lubricant oil to a part of the rotor shaft 11, that is, the journal 12, and is disposed immediately before the first bearing pad 31, on the upstream side of the first bearing pad 31 with respect to the rotational direction of the rotor shaft 11. The first oil-supply unit 4 includes a plurality of nozzles 41, 42, that is, for instance, two nozzles 41, 42. The plurality of nozzles 41, 42 of the first oil-supply unit 4 are fixed with intervals immediately before and upstream of the first bearing pad 31.

Figure 4:
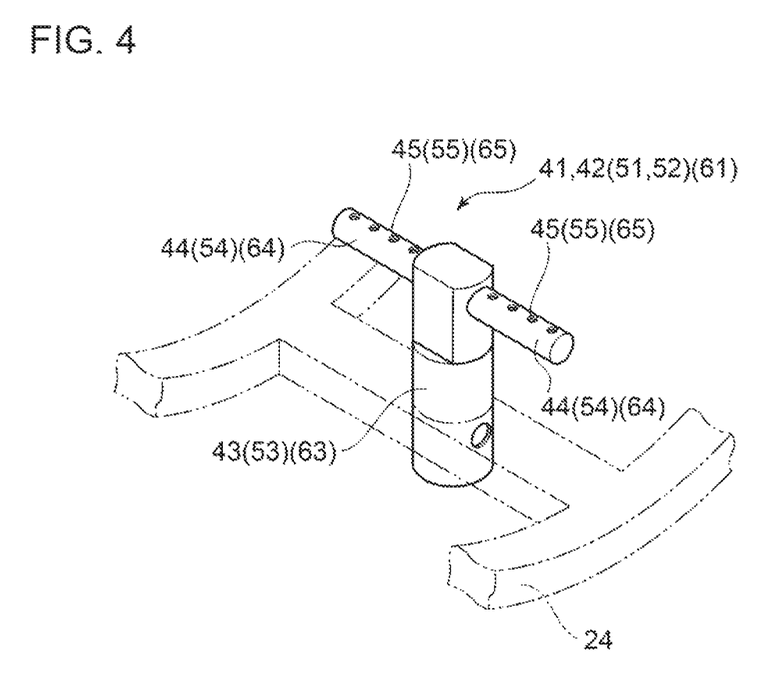
FIG. 4 is a schematic diagram of nozzles constituting a first oil-supply unit.

FIG. 4 is a schematic diagram of nozzles 41, 42 constituting the first oil-supply unit 4.

As shown in FIG. 4, the nozzles 41, 42 of the first oil-supply unit 4 include a base portion 43 and a branch portion 44. The base portion 43 has a cylindrical shape closed at the tip, is disposed along the radial direction of the carrier ring 2, and is fixed to the carrier ring 2 so as to be in communication with the manifold 24. The branch portion 44 has a cylindrical shape closed at the tip that is smaller than the cylindrical shape of the base portion 43, is disposed along the axial direction of the carrier ring 2, and is fixed to each side of the base portion 43 so as to be in communication with the interior space of the base portion 43. Further, the branch portion 44 includes a plurality of oil discharge holes 45 facing the axial center of the carrier ring 2.

As shown in FIG. 2, the second oil-supply unit 5 is for supplying lubricant oil to a part of the rotor shaft 11, that is, the journal 12, similarly to the first oil-supply unit 4, and is disposed on a circumferential directional position between the first bearing pad 31 and the second bearing pad 32. Similarly to the first oil-supply unit 4, the first oil-supply unit 4 includes a plurality of nozzles 51, 52, that is, for instance, two nozzles 51, 52. The plurality of nozzles 51, 52 of the second oil-supply unit 5 are disposed with intervals on the circumferential directional positions between the first bearing pad 31 and the second bearing pad 32. The nozzles 51, 52 have the same configuration as the nozzles 41, 42 of the first oil-supply unit 4. Thus, herein, reference signs are associated with the corresponding base portion 53, branch portion 54, and oil discharge hole 55 in FIG. 4 to simplify the description.

With this configuration, lubricant oil is supplied to the gap between the rotor shaft 11 and the second bearing pad 32 from the second oil-supply unit 5, and lubricant oil used in the first bearing pad 31 is replaced with the lubricant oil supplied from the second oil-supply unit 5. Accordingly, the second bearing pad 32 can lubricate the rotor shaft 11 with the lubricant oil supplied freshly from the second oil-supply unit 5.

Further, in some embodiments, the third oil-supply unit 6 is farther provided.

Similarly to the first oil-supply unit 4 and the second oil-supply unit 5, the third oil-supply unit 6 is for supplying lubricant oil to a part of the rotor shaft 11, that is, the journal 12, and is disposed immediately after the second bearing pad 32, on the downstream side of the second bearing pad 32 with respect to the rotational direction of the rotor shaft 11. While the third oil-supply unit 6 may include a plurality of nozzles, the third oil-supply unit 6 in the embodiment shown in FIG. 2 includes one nozzle 61. The nozzle 61 has the same configuration as the nozzle 41 of the first oil-supply unit 4. Thus, herein, reference signs are associated with the corresponding base portion 63, branch portion 64, and oil discharge hole 65 in FIG. 4 to simplify the description.

With this configuration, lubricant oil is supplied to the rotor shaft 11 from the third oil-supply unit 6, and lubricant oil that is carried over (supplied) to the first bearing pad 31 increases.

The pair of side plates 7, 7 are disposed on both end portions of the carrier ring 2 with respect to the axial direction along the outer periphery of the rotor shaft 11, thus defining both ends of the inner space of the journal bearing 1 in the axial direction of the carrier ring 2. The pair of side plates 7, 7 are fixed to the carrier ring 2 with a bolt 71.

As shown in FIG. 1, in some embodiments, the journal bearing 1 uses a direct lubrication method. That is, the journal bearing 1 includes a gap between the inner peripheral surfaces of the respective side plates 7, 7 and the outer peripheral surface of the rotor shaft 11, that is, the outer peripheral surface 12a of the journal 12, for bringing into communication the outside and a bearing interior space surrounded by the pair of side plates 7, 7. Thus, the interior space of the journal bearing 1 is not completely filled with lubricant oil. Instead, at least a part of the interior space of the journal bearing 1 is occupied by air that has entered from the outside. Further, the pressure of lubricant oil that exists inside the journal bearing 1 is similar to the atmospheric pressure.

In this regard, the journal bearing 1 of the above described direct lubrication method is different from a journal bearing of the oil-bath lubrication method whose bearing interior space is filled with lubricant oil. In the journal bearing of the oil-bath lubrication method, a seal member is provided between a side plate and a journal outer peripheral surface to prevent leakage of lubricant oil to outside from the bearing interior space, and the bearing interior space is filled with lubricant oil. Thus, the lubricant oil that exists in the interior space of the journal bearing of the oil-bath lubrication method has a higher pressure than the atmospheric pressure.

Herein, in the journal bearing 1 of the direct lubrication method, the oil-film thickness tends to become insufficient at a bearing pad (first bearing pad 31) positioned upstream with respect to the rotational direction of the rotor shaft 11. The reason thereof is considered to be shortage of lubricant oil that is carried over to the first bearing pad 31.

That is, in the journal bearing 1 of the direct lubrication method, lubricant oil is less likely to be carried over due to the head difference. In addition, a gap is provided between the inner peripheral surfaces of the respective side plates 7, 7 and the outer peripheral surface of the rotor shaft 11 for bringing into communication the outside and a bearing interior space surrounded by the pair of side plates 7, 7, and thus lubricant oil is likely to leak in the second region disposed upstream of the first region. Thus, lubricant oil to be carried over to the first bearing pad 1 reduces, which leads to shortage of lubricant oil to be supplied to the first bearing pad 31. Particularly in a case where the surface pressure of the rotor shaft 11 on the first bearing pad 31 and the second bearing pad 32 is low, or in a case where the rotor shaft 11 rotates in a low rotation speed region, a smaller amount of lubricant oil is carried over to the first bearing pad 31, and the shortage of lubricant oil at the first bearing pad 31 is remarkable. When lubricant oil supplied to the first bearing pad 31 is insufficient, the first bearing pad 31 is not wet from the inlet and the generation region of the oil film pressure becomes narrow, which causes the oil film of the first bearing pad 31 to become thinner. Accordingly, in a case where the surface pressure of the rotor shaft 11 on the first bearing pad 31 is low, or in a case where the rotor shaft 11 rotates in a low rotation speed region, the shaft center trajectory of the rotor shaft 11I may deviate from the vertical line and impair the isotropic nature of the journal bearing 1. On the other hand, if the oil amount of lubricant oil to be carried over to the first bearing pad 31 is excessively large, the stirring resistance of the rotor shaft 11 may also increase.

Thus, in some embodiments, as shown in FIGS. 5 to 8, at least one openings (72a, 72b, 73, 74, 75, 25, 26, 27) are provided, which bring the bearing interior space (R1, R2) surrounded by the at least two bearing pads (31, 32) and a pair of side plates 7, 7 into communication with the atmosphere, and which are configured to discharge lubricant oil to outside from the bearing interior space (R1, R2).

In this case, even if the gap between the inner peripheral surface of the side plate 7 and the outer peripheral surface of the rotor shaft 11 is narrowed, lubricant oil is discharged outside through the opening (72a, 72b, 73, 74, 75, 25, 26, 27) from the bearing interior space (R1, R2), which prevents the bearing interior space (R1, R2) from being filled with the lubricant oil, which makes it possible to suppress an increase in the stirring resistance of the rotor shaft 11. Furthermore, it is possible to narrow the gap between the inner peripheral surface of the side plate 7 and the outer peripheral surface of the rotor shaft 11, and thus lubricant oil is less likely to leak from between the rotor shaft 11 and the side plate 7, whereby a sufficient lubricant oil is carried over (supplied) to the first bearing pad 31. In this way, even in a case where the surface pressure of the rotor shaft 11 on the first bearing pad 31 is low, or in a case where the rotor shaft 11 rotates in a low rotation speed region, it is possible to ensure a sufficient oil film thickness on the first bearing pad 31. Furthermore, excess lubricant oil is discharged from between the rotor shaft 11 and the side plate 7 through the openings (72a, 72b, 73, 74, 75, 25, 26, 27), which prevents congestion of lubricant oil, which makes it possible to suppress an increase in the stirring resistance of the rotor shaft 11.

As shown in FIGS. 5 and 6, in some embodiments, one or more openings (72a, 72b, 73) are disposed in the lower half region of the side plate 7.

With this configuration, excess lubricant oil is discharged from the lower half region of the side plate 7. In this way, it is possible to suppress an increase in stirring loss of the rotor shaft 11.

Figure 8:
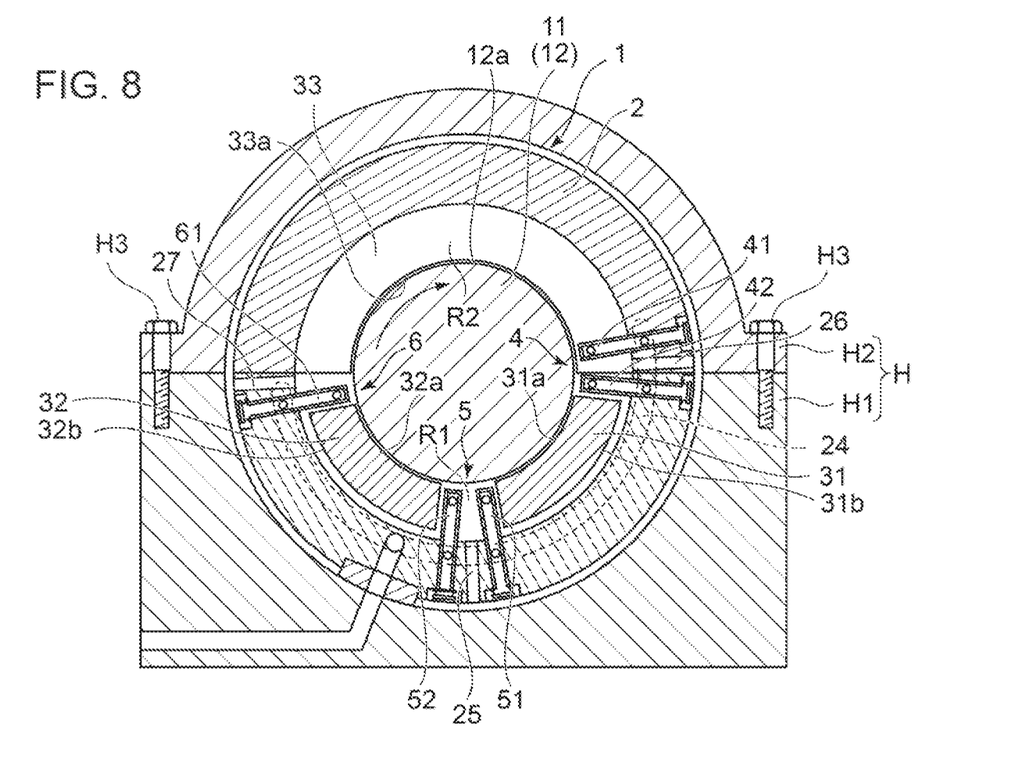
FIG. 8 is a schematic view of a journal bearing according to an embodiment.

As shown in FIGS. 7 and 8, in some embodiments, one or more openings (25, 26, 27) are disposed in the lower half region of the carrier ring 2.

With this configuration, excess lubricant oil is discharged from the lower half region of the carrier ring 2. In this way, it is possible to suppress an increase in stirring loss of the rotor shaft 11.

As shown in FIGS. 5 to 8, in some embodiments, one or more openings (72a, 72b, 73, 25) are disposed on the circumferential directional positions between the first bearing pad 31 and the second bearing pad 32.

With this configuration, excess lubricant oil is discharged from the circumferential directional positions between the first bearing pad 31 and the second bearing pad 32. In this way, it is possible to prevent congestion of lubricant oil between the first bearing pad 31 and the second bearing pad 32, and suppress an increase in stirring loss of the rotor shaft 11.

As shown in FIGS. 5, 6, and 8, in some embodiments, at least one opening (74, 75, 76) is disposed on at least one of the circumferential directional position between the guide metal 33 and the first bearing pad 31, or the circumferential directional position between the guide metal 33 and the second bearing pad 32, in addition to the circumferential directional position between the first bearing pad 31 and the second bearing pad 32.

With this configuration, excess lubricant oil is discharged from the circumferential directional position between the guide metal 33 and the first bearing pad 31, or from the circumferential directional position between the guide metal 33 and the second bearing pad 32. In this way, it is possible to prevent congestion of lubricant oil between the guide metal 33 and the first bearing pad 31 or between the guide metal 33 and the second bearing pad 32, and suppress an increase in stirring loss of the rotor shaft 11.

As shown in FIGS. 5 to 8, in some embodiments, at least one openings (74, 26) are disposed on the circumferential positional range excluding the extending range of the guide metal 33.

With this configuration, lubricant oil is less likely to leak from the extending range of the guide metal 33, which makes it possible to promote carry over of lubricant oil effectively despite a head difference.

Embodiments of the present invention were described in detail above, but the present invention is not limited thereto, and various amendments and modifications may be implemented.

DESCRIPTION OF REFERENCE NUMERALS

1 Journal bearing
11 Rotor shaft
12 Journal
12a Outer peripheral surface
2 Carrier ring
24 Manifold
25 Opening
26 Opening
27 Opening
31 First bearing pad
31a Inner peripheral surface
31b Outer peripheral surface
32 Second bearing pad
32a Inner peripheral surface
32b Outer peripheral surface
33 Guide metal
33a Bearing surface
4 First oil-supply unit
41, 42 Nozzle
43 Base portion
44 Branch portion
Oil discharge hole
Second oil-supply unit
51, 52 Nozzle
53 Base portion
54 Branch portion
55 Oil discharge hole
6 Third oil-supply unit
61 Nozzle
63 Base portion
64 Branch portion
65 Oil discharge hole
7 Side plate
71 Bolt
72a, 72b Opening
73 Opening
74 Opening
75 Opening
R1, R2 Bearing interior space
H Housing
H1 Mount portion
H2 Cover
H3 Bolt

The invention claimed is:
1. A journal bearing, comprising:
a carrier ring having a cylindrical shape;
at least two bearing pads disposed on a radially inner side of the carrier ring and configured to support a rotor shaft;
at least one oil-supply unit disposed on the radially inner side of the carrier ring, for supplying lubricant oil to a gap between the bearing pad and the rotor shaft;
a pair of side plates disposed on both end portions of the carrier ring with respect to an axial direction, along an outer periphery of the rotor shaft;
a gap formed between an inner peripheral surface of each of the pair of side plates and an outer peripheral surface of the rotor shaft; and
at least one opening formed so as to penetrate the pair of side plates, the at least one opening configured to bring a bearing interior space surrounded by the at least two bearing pads and the pair of side plates into communication with an atmosphere and to discharge the lubricant oil to the atmosphere,
wherein the at least one opening includes an opening into the bearing interior space formed between the at least two bearing pads with respect to a circumferential direction of the rotor shaft.

2. The journal bearing according to claim 1,
wherein the at least one oil-supply unit includes an oil supply unit disposed on a circumferential-directional position interposed between the at least two bearing pads.

3. The journal bearing according to claim 1,
wherein the at least one opening is disposed in a lower half region of the side plates.

4. The journal bearing according to claim 1,
wherein the at least two bearing pads include:
a first bearing pad disposed on a radially inner side of a lower half region of the carrier ring; and
a second bearing pad disposed on the radially inner side of the lower half region of the carrier ring, on a downstream side of the first bearing pad with respect to a rotational direction of the rotor shaft, and configured to support the rotor shaft from below, and
wherein the at least one opening is disposed at a position that is between the first bearing pad and the second bearing pad in a circumferential direction.

5. The journal bearing according to claim 4, wherein the at least one oil-supply unit includes:
a first oil-supply unit positioned immediately before and upstream of the first bearing pad; and
a second oil-supply unit disposed at the position that is between the first bearing pad and the second bearing pad in a circumferential direction.

6. The journal bearing according to claim 5,
further comprising a third oil-supply unit disposed downstream of the second bearing pad.

7. The journal bearing according to claim 4,
further comprising a guide metal disposed on a radially inner side of an upper half region of the carrier ring, the guide metal covering an upper region of an outer peripheral surface of the rotor shaft,
wherein the at least one opening includes at least two openings and the at least two openings are disposed in at least one of a position that is between the guide metal and the first bearing pad in the circumferential direction or a position that is between the guide metal and the second bearing pad in the circumferential direction, in addition to the position that is between the first bearing pad and the second bearing pad in the circumferential direction.

8. The journal bearing according to claim 1,
further comprising a guide metal disposed on a radially inner side of an upper half region of the carrier ring, the guide metal covering an upper region of an outer peripheral surface of the rotor shaft,
wherein the at least one opening is disposed in a circumferential positional range excluding an extending range of the guide metal.

9. A rotary machine, comprising: a journal bearing according to claim 1; and
a rotor shaft supported by the journal bearing.

* * * * *